(12) United States Patent
Campbell et al.

(10) Patent No.: US 11,058,239 B2
(45) Date of Patent: Jul. 13, 2021

(54) CABLE GRAPPLING ASSEMBLY

(71) Applicants: Edward Campbell, Newton, NH (US); Christine Campbell, Newton, NH (US)

(72) Inventors: Edward Campbell, Newton, NH (US); Christine Campbell, Newton, NH (US)

( * ) Notice: Subject to any disclaimer, the term of this patent is extended or adjusted under 35 U.S.C. 154(b) by 56 days.

(21) Appl. No.: 16/533,371

(22) Filed: Aug. 6, 2019

(65) Prior Publication Data
US 2021/0037994 A1 Feb. 11, 2021

(51) Int. Cl.
*A47F 13/06* (2006.01)
*B65G 7/12* (2006.01)
*B25B 9/02* (2006.01)
*A62C 33/04* (2006.01)

(52) U.S. Cl.
CPC ............... *A47F 13/06* (2013.01); *B25B 9/02* (2013.01); *B65G 7/12* (2013.01); *A62C 33/04* (2013.01)

(58) Field of Classification Search
CPC .. A47F 13/06; B65G 7/12; B25B 9/02; A62C 33/04
See application file for complete search history.

(56) References Cited

U.S. PATENT DOCUMENTS

| | | | |
|---|---|---|---|
| 1,001,962 A * | 8/1911 | Landes | B62B 1/264 414/457 |
| 2,517,507 A * | 8/1950 | Rowan | A01K 97/14 294/26 |
| 2,882,084 A * | 4/1959 | Eatinger | A01K 97/14 294/26 |
| 4,580,825 A * | 4/1986 | Johnson | A62B 3/005 119/802 |
| 4,856,834 A | 8/1989 | Lancaster | |
| 5,171,052 A | 12/1992 | Cunningham | |
| D332,382 S | 1/1993 | Wescott | |
| 5,893,799 A * | 4/1999 | Studley, Jr. | F41B 15/00 119/807 |
| 5,979,840 A | 11/1999 | Hollister | |
| 6,447,033 B1 | 9/2002 | Konczak | |
| 7,699,368 B2 | 4/2010 | Nicol | |
| D623,489 S | 9/2010 | Powell | |
| D698,105 S * | 1/2014 | Huster | D30/199 |
| 2004/0174027 A1 | 9/2004 | Bennett | |

* cited by examiner

*Primary Examiner* — Stephen A Vu

(57) ABSTRACT

A cable grappling assembly for lifting, dragging or otherwise manipulating a cable lying on the ground includes a handle that is elongated to a length of at least 36.0 inches to extend approximately from a user's waist to the ground when the handle is gripped. A grapple is coupled to the handle for engaging a cable lying on the ground without requiring the user to bend over. Moreover, the grapple is curved to engage the cable for lifting and dragging the cable.

6 Claims, 3 Drawing Sheets

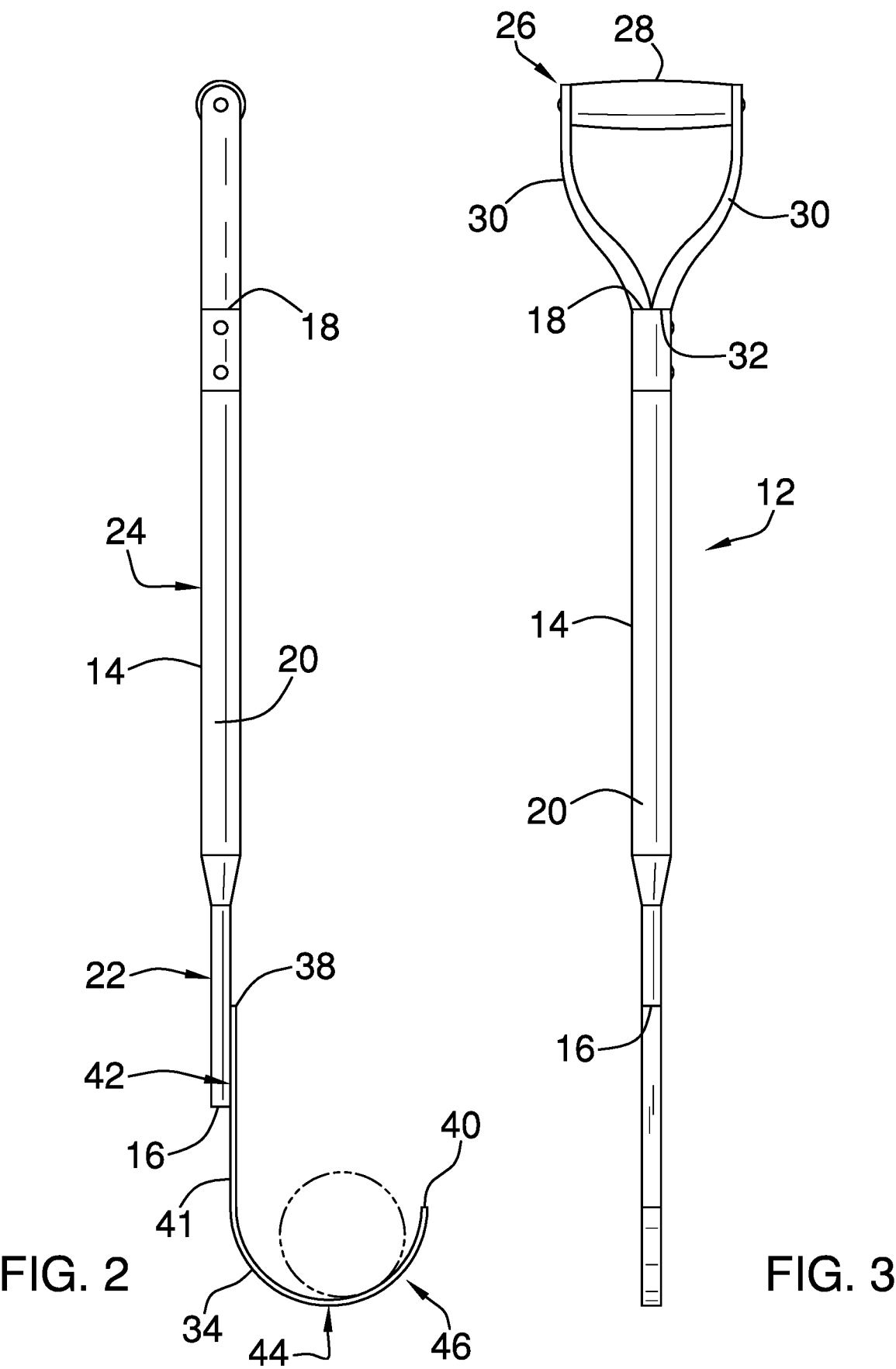

CABLE GRAPPLING ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to grappling devices and more particularly pertains to a new grappling device for lifting, dragging or otherwise manipulating a cable lying on the ground.

BRIEF SUMMARY OF THE INVENTION

An embodiment of the disclosure meets the needs presented above by generally comprising a handle that is elongated to a length of at least 36.0 inches to extend approximately from a user's waist to the ground when the handle is gripped. A grapple is coupled to the handle for engaging a cable lying on the ground without requiring the user to bend over. Moreover, the grapple is curved to engage the cable for lifting and dragging the cable.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a right side view of an embodiment of the disclosure.

FIG. 3 is a front view of an embodiment of the disclosure.

DETAILED DESCRIPTION OF THE INVENTION

Figure 1:
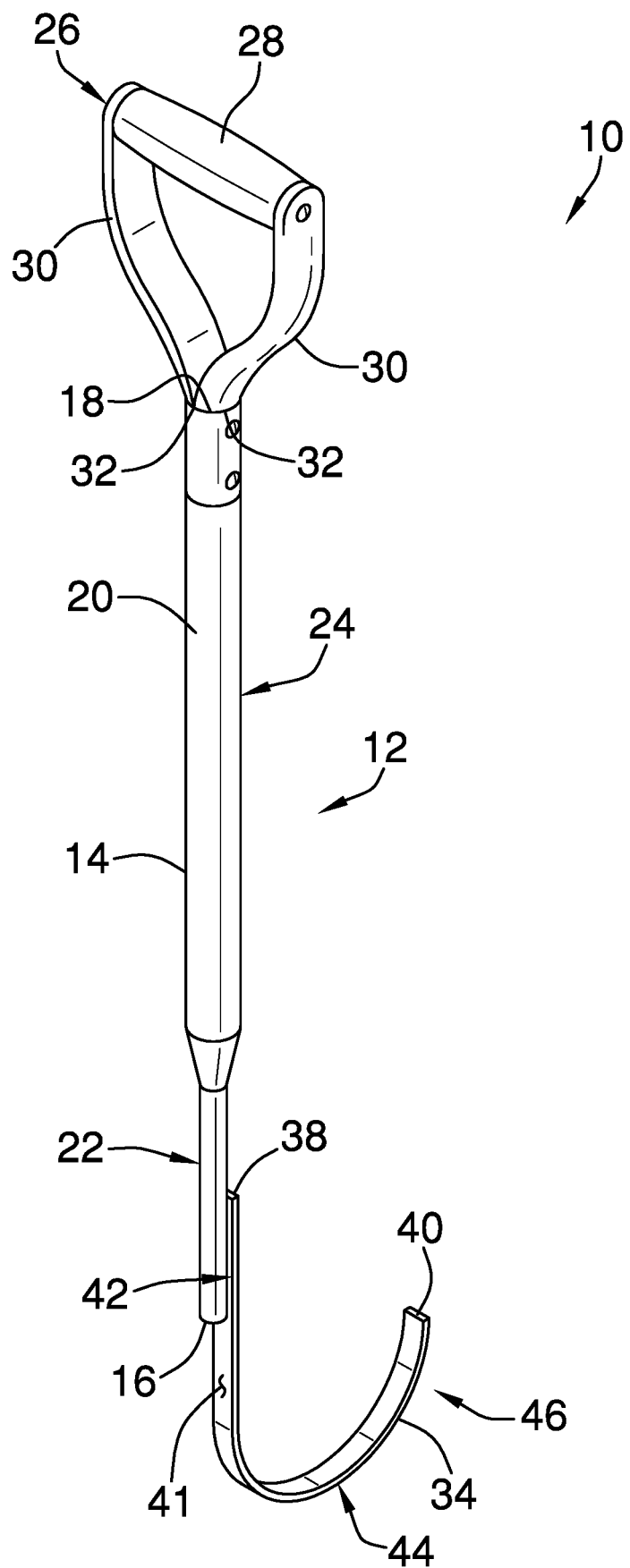
FIG. 1 is a perspective view of a cable grappling assembly according to an embodiment of the disclosure.
Figure 4:
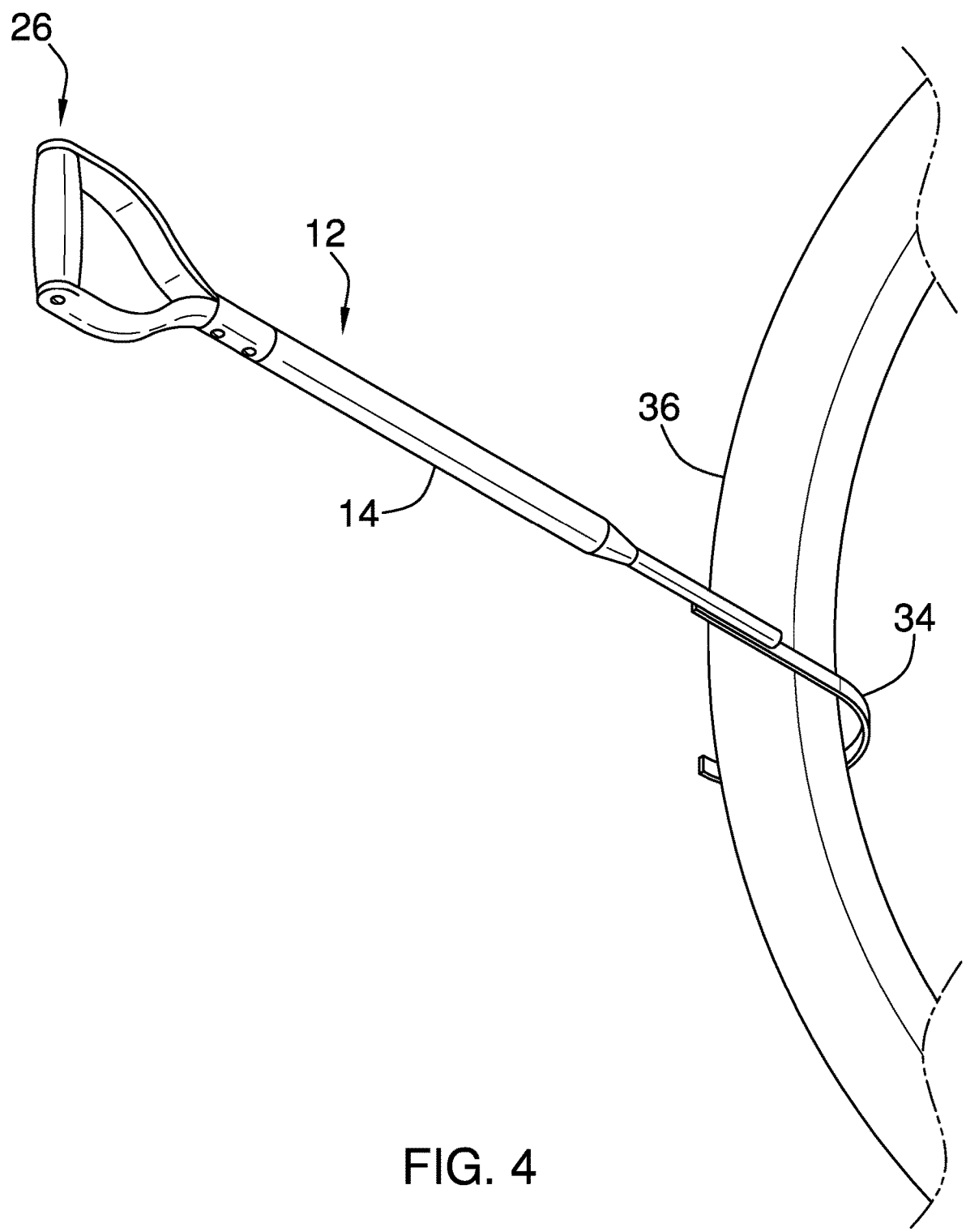
FIG. 4 is a perspective in-use view of an embodiment of the disclosure.

With reference now to the drawings, and in particular to FIGS. 1 through 4 thereof, a new grappling device embodying the principles and concepts of an embodiment of the disclosure and generally designated by the reference numeral 10 will be described.

As best illustrated in FIGS. 1 through 4, the cable grappling assembly 10 generally comprises a handle 12 that is elongated to a length of at least 36.0 inches. In this way the handle 12 can extend approximately from a user's waist to the ground when the handle 12 is gripped. The handle 12 comprises a shaft 14 that has a first end 16, a second end 18 and an outer wall 20 extending therebetween. The outer wall 20 tapers inwardly between the first end 16 and a point that is spaced from the first end 16 to define a lower portion 22 of the shaft 14 that has a diameter being less than a diameter of an upper portion 24 of the shaft 14.

The handle 12 further includes a grip 26 that has a central member 28 extending between a pair of supports 30. Each of the supports 30 has a distal end 32 with respect to the central member 28 and each of the supports 30 curves inwardly between the central member 28 and the distal end 32 of each of the supports 30. Moreover, the distal end 32 of each of the supports 30 is coupled to the second end 18 of the shaft 14 having the central member 28 being oriented transverse to the shaft 14 for gripping. The grip 26 may comprise a shovel handle or other similar hand tool handle.

A grapple 34 provided and the grapple 34 is coupled to the handle 12. In this way the grapple 34 can engage a cable, a charged fire hose or any other elongated, tubular object 36 that is lying on the ground. Additionally, the grapple 34 facilitates the cable, charged fire hose or other elongated, tubular object 36 to be manipulated without requiring the user to bend over. In this way the grapple 34 facilitates the cable, charged fire hose or other elongated, tubular object 36 to be moved without serious risk of lower back injury. The grapple 34 is curved for engage the cable, charged fire hose or other elongated, tubular object 36 and subsequently lifting, dragging or otherwise manipulating the cable, charged fire hose or other elongated, tubular object 36.

The grapple 34 has a primary end 38, a secondary end 40 and a first surface 41 extending therebetween. The first surface 41 has a straightened portion 42 that extends from the primary end 38 toward the secondary end 40. Additionally, the first surface 41 has an arcuate portion 44 extending between the straightened portion 42 and the secondary end 40 such that arcuate portion 44 forms a hook 46 having the secondary end 40 being spaced from the straightened portion 42. The first surface 41 of the straightened portion 42 is coupled to the outer wall 20 of the shaft 14. Additionally, the straightened portion 42 is positioned on the lower portion 22 of the shaft 14 and the straightened portion 42 is oriented to be collinear with the lower the shaft 14. Moreover, the straightened portion 42 extends downwardly beyond the first end 16 of the shaft 14.

In use, each of the central member 28 of the grip 26 and the shaft 14 is gripped to facilitate the grapple 34 to engage the cable, charged fire hose or other elongated, tubular object 36 that is lying on the ground. In this way the cable, charged fire hose or other elongated tubular object 36 can be dragged, lifted or otherwise manipulated without requiring the user to bend over. In this way the cable, charged fire hose or other elongated tubular object 36 can be manipulated without exposing the user to a high risk of lower back injury.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A cable grappling assembly being configured to grapple an elongated cable for lifting and moving the cable without requiring a user to bend over thereby reducing the likelihood of lower back injuries, said assembly comprising:
    a handle being elongated to a length of at least 36.0 inches wherein said handle is configured to extend approximately from a user's waist to the ground when said handle is gripped;
    a grapple being coupled to said handle wherein said grapple is configured to engage a cable lying on the ground without requiring the user to bend over, said grapple being curved wherein said grapple is configured to engage the cable for lifting and dragging the cable; and
    wherein said handle comprises a shaft having a first end, a second end and an outer wall extending therebetween, said outer wall tapering inwardly between said first end and a point being spaced from said first end to define a lower portion of said shaft having a diameter being less than a diameter of an upper portion of said shaft.

2. The assembly according to claim 1, wherein said handle comprises a grip having a central member extending between a pair of supports, each of said supports having a distal end with respect to said central member, each of said supports curving inwardly between said central member and said distal end of each of said supports, said distal end of each of said supports being coupled to said second end of said shaft having said central member being oriented transverse to said shaft wherein said central member is configured to be gripped.

3. A cable grappling assembly being configured to grapple an elongated cable for lifting and moving the cable without requiring a user to bend over thereby reducing the likelihood of lower back injuries, said assembly comprising:
    a handle being elongated to a length of at least 36.0 inches wherein said handle is configured to extend approximately from a user's waist to the ground when said handle is gripped, said handle comprising:
        a shaft having a first end, a second end and an outer wall extending therebetween, said outer wall tapering inwardly between said first end and a point being spaced from said first end to define a lower portion of said shaft having a diameter being less than a diameter of an upper portion of said shaft; and
        a grip having a central member extending between a pair of supports, each of said supports having a distal end with respect to said central member, each of said supports curving inwardly between said central member and said distal end of each of said supports, said distal end of each of said supports being coupled to said second end of said shaft having said central member being oriented transverse to said shaft wherein said central member is configured to be gripped; and
    a grapple being coupled to said handle wherein said grapple is configured to engage a cable lying on the ground without requiring the user to bend over, said grapple being curved wherein said grapple is configured to engage the cable for lifting and dragging the cable.

4. The assembly according to claim 3, wherein said grapple has a primary end, a secondary end and a first surface extending therebetween, said first surface having a straightened portion extending from said primary end toward said secondary end, said first surface having an arcuate portion extending between said straightened portion and said secondary end such that arcuate portion forms a hook having said secondary end being spaced from said straightened portion.

5. The assembly according to claim 4, wherein said first surface of said straightened portion is coupled to said outer wall of said shaft, said straightened portion being positioned on said lower portion of said shaft having, said straightened portion being oriented to be collinear with said lower said shaft having said straightened portion extending downwardly beyond said first end of said shaft.

6. A cable grappling assembly being configured to grapple an elongated cable for lifting and moving the cable without requiring a user to bend over thereby reducing the likelihood of lower back injuries, said assembly comprising:
    a handle being elongated to a length of at least 36.0 inches wherein said handle is configured to extend approximately from a user's waist to the ground when said handle is gripped, said handle comprising:
        a shaft having a first end, a second end and an outer wall extending therebetween, said outer wall tapering inwardly between said first end and a point being spaced from said first end to define a lower portion of said shaft having a diameter being less than a diameter of an upper portion of said shaft; and
        a grip having a central member extending between a pair of supports, each of said supports having a distal end with respect to said central member, each of said supports curving inwardly between said central member and said distal end of each of said supports, said distal end of each of said supports being coupled to said second end of said shaft having said central member being oriented transverse to said shaft wherein said central member is configured to be gripped; and a grapple being coupled to said handle wherein said grapple is configured to engage a cable lying on the ground without requiring the user to bend over, said grapple being curved wherein said grapple is configured to engage the cable for lifting and dragging the cable, said grapple having a primary end, a secondary end and a first surface extending therebetween, said first surface having a straightened portion extending from said primary end toward said secondary end, said first surface having an arcuate portion extending between said straightened portion and said secondary end such that arcuate portion forms a hook having said secondary end being spaced from said straightened portion, said first surface of said straightened portion being coupled to said outer wall of said shaft, said straightened portion being positioned on said lower portion of said shaft having, said straightened portion being oriented to be collinear with said lower said shaft having said straightened portion extending downwardly beyond said first end of said shaft.

\* \* \* \* \*